US008745641B1

(12) United States Patent (10) Patent No.: US 8,745,641 B1
Coker (45) Date of Patent: Jun. 3, 2014

(54) AUTOMATIC VERIFICATION AND ANOMALY DETECTION IN A REPRESENTATIONAL STATE TRANSFER (REST) APPLICATION PROGRAMMING INTERFACE

(75) Inventor: Doug Coker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 510 days.

(21) Appl. No.: 13/182,803

(22) Filed: Jul. 14, 2011

(51) Int. Cl.
 *G06F 3/00* (2006.01)
 *G06F 9/44* (2006.01)
 *G06F 9/46* (2006.01)
 *G06F 13/00* (2006.01)

(52) U.S. Cl.
 USPC ........... 719/328; 719/313; 719/318; 719/319; 719/320

(58) Field of Classification Search
 None
 See application file for complete search history.

(56) References Cited

U.S. PATENT DOCUMENTS

| | | | | |
|---|---|---|---|---|
| 2008/0256612 | A1* | 10/2008 | Roy et al. | 726/5 |
| 2009/0164973 | A1* | 6/2009 | Barnett et al. | 717/110 |
| 2009/0235349 | A1* | 9/2009 | Lai et al. | 726/14 |
| 2012/0047228 | A1* | 2/2012 | Aly | 709/217 |
| 2012/0059919 | A1* | 3/2012 | Glaser et al. | 709/223 |

OTHER PUBLICATIONS

"Representational State Transfer", http://web.archive.org/20100618202621/http://en.wikipedia.org/wiki/Representational_state_transfer", last modified Jun. 18, 2010, downloaded Nov. 14, 2011, pp. 1-7.
"Representational state transfer", http://en.wikipedia.org/wiki/Representational_state_transfer", last modified Oct. 28, 2011, downloaded Oct. 31, 2011, pp. 1-9.
"Architectural Styles and the Design of Network-based Software Architectures—Dissertation", University of California, Irvine, 2000, http://www.ics.uci.edu/~fielding/pubs/dissertation/top.htm, pp. 1-162.
Costello, Roger L., "REST (Representational State Transfer", http://www.xfront.com/REST.html, 2002, downloaded Nov. 1, 2011, pp. 1-61.
Deitel, P.J., et al., *Internet & World Wide Web How to Program, 4th Edition*, 2008, pp. Cover, Information, Table of Contents, 82-85, 1226-1227, and 1283-1302, and Index.

* cited by examiner

*Primary Examiner* — H S Sough
*Assistant Examiner* — Craig Dorais
(74) *Attorney, Agent, or Firm* — Honigman Miller Schwartz and Cohn LLP (57) ABSTRACT

Methods for automatically detecting an anomaly in an application programming interface (API) having a plurality of invariants is provided. Such an API may conform to a Representational State Transfer (REST) model or style of software architecture. Such methods enable users to build simple test scripts that can be fed into specialized software applications configured to automatically exercise and test the API using the test scripts. Further, such methods allow automatic testing of API functionality regardless of whether or not the expected output value(s) for a given input are specified.

28 Claims, 6 Drawing Sheets

AUTOMATIC VERIFICATION AND ANOMALY DETECTION IN A REPRESENTATIONAL STATE TRANSFER (REST) APPLICATION PROGRAMMING INTERFACE

BACKGROUND

1. Field

Embodiments relate generally to the field of application programming interface development and testing.

2. Background

The engineering work devoted to writing software that supports the development and testing of an application programming interface (API) generally involves numerous operations that require careful human consideration. Accordingly, such complex and time-consuming work often tends to be prone to error. In addition, software engineers involved in development of the API may find the work to be tedious or technically uninteresting, and therefore, may be more likely to make errors during implementation. Furthermore, the development of an elegant API to expose to end-users can require artisan skill and consideration, and is generally not a process that can be automated.

BRIEF SUMMARY

Embodiments relate to automatically detecting an anomaly in an application programming interface (API) having a plurality of invariants. For example, such an API may conform to a Representational State Transfer (REST) model or style of software architecture. In an embodiment, a data transfer request is generated based on a first mapping of a representational state transfer (i.e., REST) operation to a first uniform resource locator template and a request payload. The request payload is associated with one or more commands that are written in a domain specific language. The domain specific language enables the REST operation to be expressed using the one or more commands independently of the request payload's syntax or escape characters. The generated data transfer request is then submitted to a server that implements the application programming interface (API) for processing. Once a response is received from the server based on the submitted data transfer request, the response is automatically tested based on the one or more first commands in order to verify that it satisfies one or more invariants of the REST API.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

The accompanying drawings, which are incorporated herein and form part of the specification, illustrate the embodiments of the present invention and, together with the description, further serve to explain the principles of embodiments and to enable a person skilled in the relevant art(s) to make and use such embodiments.

DETAILED DESCRIPTION

Introduction

Embodiments relate to automatically detecting an anomaly in an application programming interface (API) having a plurality of invariants. For example, such an API may conform to a Representational State Transfer (REST) model or style of software architecture. As will be described in further detail below, REST-style software architectures may consist of multiple clients and servers that communicate over a network, for example, the Internet (or "World Wide Web"). For example, a client in a system conforming to REST rules of operation may initiate one or more data transfer requests to a server for processing. Once the server processes the requests, it may return an appropriate response for each request.

A data transfer request and the corresponding response generally involve the transfer of representations of resources. For example, such a resource may include any coherent and meaningful concept that may be addressed in the system. Further, a representation of such a resource may be in the form of a document intended to capture the current or desired state of the particular resource. A person skilled in the relevant art given this description would recognize additional characteristics and principles of REST and REST-compliant applications and interfaces.

As will be described in further detail below, embodiments enable users, for example, software developers and/or quality assurance (QA) engineers involved in the development and testing of an API, to minimize the risk of errors introduced during the development of an API. An example of such an API includes, but is not limited to, a Web API (also commonly known as a "Web service") that complies with REST principles. The use of such a REST-compliant Web API or service typically involves the transfer of REST-style communications in the form of requests and responses between clients and servers over a network (e.g., the Internet), as noted above.

As will be described in the further detail below, embodiments can also enable users to build simple test scripts that can be fed into specialized software applications configured to automatically exercise and test the API using the test scripts. Further, embodiments allow automatic testing of API functionality regardless of whether or not the expected output value(s) for a given input are specified. For example, API tests may be derived automatically from a testing script even when such tests are not explicitly defined in the testing script. Accordingly, embodiments enable users to test the functionality of the API as it is intended to perform based on the expected behavior of the API as specified in one or more testing scripts. In this way, embodiments help to reduce the tedium of implementing tests while allowing more of an API's functionality to be tested than would be tested manually or by using conventional techniques. Ultimately, the quality of the API implementation is improved since a greater number of API tests can be conducted than would be conducted otherwise. For example, test scripts can be applied to many REST APIs to detect implementation errors and contribute to testing, such as, end-to-end or integration testing.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The terms "REST" and "RESTful" are used herein interchangeably to describe any API, software operation, method, interface, application, or other construct that conforms to rules or constraints associated with a representational state transfer (REST) model or style of software architecture, as described above. A person skilled in the relevant art given this description would appreciate the characteristics of such rules or constraints as applied to REST/RESTful operations, applications, and interfaces.

System

Figure 1:
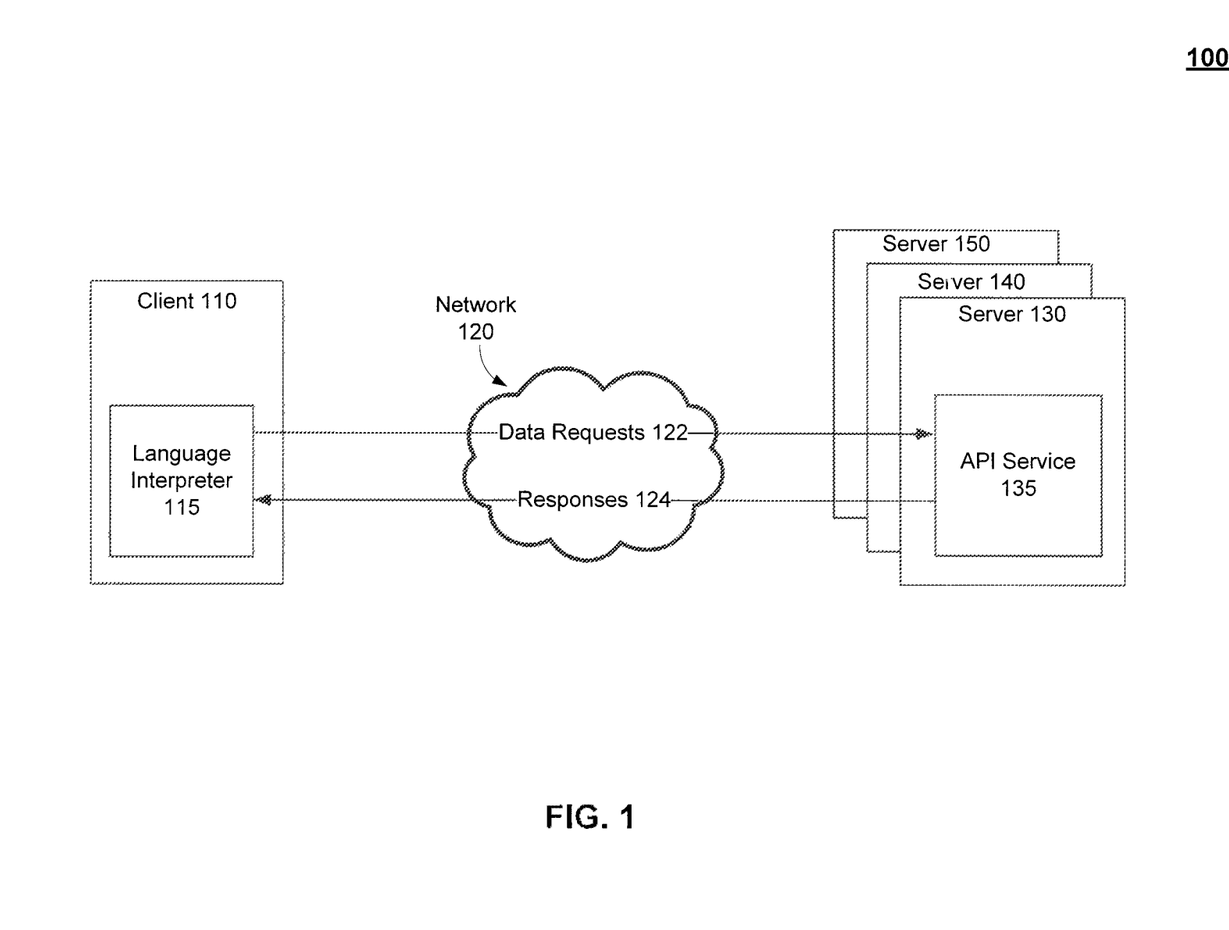
FIG. 1 is a diagram of an exemplary distributed system suitable for practicing an embodiment.

FIG. 1 is a diagram of an exemplary distributed system 100 suitable for practicing an embodiment. In the example shown in FIG. 1, system 100 includes a client 110, a language interpreter 115, a network 120, data requests 122, responses 124, servers 130, 140, and 150, and an API service 135.

Client 110 communicates with one or more servers 130, for example, across network 120. Although only servers 130, 140, and 150 are shown, more servers may be used as necessary. Network 120 can be any network or combination of networks that can carry data communication. Such network can include, but is not limited to, a local area network, medium area network, and/or wide area network such as the Internet. Client 110 can be a general-purpose computer with a processor, local memory, a display, and one or more input devices, for example and without limitation, a keyboard, mouse, or touchscreen. Alternatively, client 110 can be a specialized computing device such as, for example, a mobile handset. Server(s) 130, similarly, can be implemented using any general-purpose computer capable of serving data to client 110.

In an embodiment, client 110 executes a language interpreter 115. Language interpreter 115 may be implemented on any type of computing device. Such a computing device can include, but is not limited to, a personal computer, mobile device such as a mobile phone or tablet computer, workstation, embedded system, set-top box, or any other computing device. Further, such a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components.

As illustrated in FIG. 1, language interpreter 115 transmits one or more data requests 122 to server(s) 130 over network 120. In an embodiment, language interpreter 115 sends data requests 122 in response to user input, as will be described in further detail below. The user input may be received at client 110 via an input device (e.g., a keyboard, mouse, or touchscreen, as noted above) coupled to client 110. In an embodiment, data requests 122 are Hypertext Transfer Protocol (HTTP) requests or request messages. For example, each HTTP request message sent by language interpreter 115 may include one or more standard HTTP methods, for example and without limitation, the "GET," "POST," "PUT," and "DELETE" methods. The function and operation of HTTP and HTTP methods would be apparent to a person skilled in the relevant art given this description.

In an embodiment, server 130 invokes API service 135 to perform one or more operations specified by data requests 122. Results of such operation(s) performed by API service 135 are sent as response messages (i.e., responses 124) to language interpreter 115 over network 120. API service 135 can be any API used to access services and/or resources over network 120. For example, API service 135 may be implemented as a web service or web API. In an embodiment, API service 135 implements a REST API as described above. Consequently, such a REST API can have a plurality of constraints, invariants or predicate conditions that hold true before and after the execution of the one or more operations specified by data requests 122. In an example, as will be described in further detail below with respect to FIG. 2, language interpreter 115 may be used to verify that responses 124 satisfy the known invariants or predicate conditions of the REST API.

For example, some of the invariants associated with such a REST API may be used to define the type and structure of data requests 122 (e.g., in the form of HTTP request messages). Further, such invariants may also be used to define the proper structure of responses 124 from API service 135. For example, a proper structure of each response in responses 124 from API service 135 may be based on the type of data request that is transmitted by language interpreter 115 to API service 135. It would be apparent to a person skilled in the relevant art given this description that the content bodies of data requests 122 (or "data request bodies") and responses 124 (or "response bodies") may be formatted using any number of well-known programming, scripting, and/or markup languages including, for example and without limitation, JavaScript Object Notation (JSON), Extensible Markup Language (XML), or Hypertext Markup Language (HTML).

Figure 2:
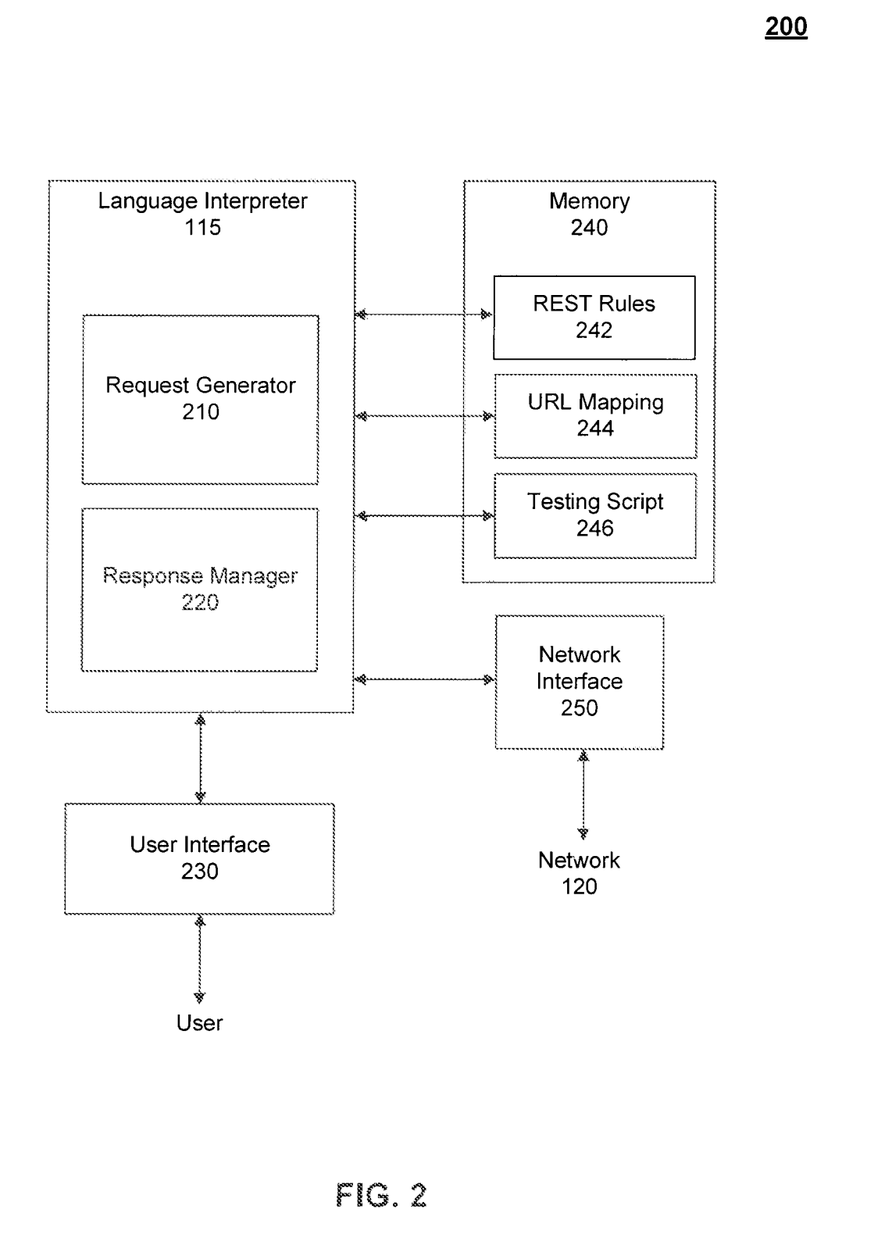
FIG. 2 is a diagram of an exemplary language interpreter for automatically detecting an anomaly in an API having a plurality of invariants, according to an embodiment.

FIG. 2 is a diagram of an exemplary system 200 for implementing a language interpreter 115 for automatically detecting an anomaly in an API having a plurality of invariants (i.e., a REST API), according to an embodiment. For ease of explanation, system 200 will be described with respect to system 100 of FIG. 1 as described above; however, embodiments are not intended to be limited thereto. In the example shown in FIG. 2, language interpreter 115 includes a request generator 210 and a response manager 220. System 200 also includes a user interface 230, a memory 240, and a network interface 250. Memory 240 may be any memory or storage location for storing information accessible to language interpreter 115. In an embodiment, memory 240 includes REST rules 242, a universal resource locator (URL) mapping 244, and a testing script 246. Request generator 210, response manager 220, user interface 230, memory 240, and network interface 250 may be implemented using, for example, client 110 of system 100, as described above and as illustrated in FIG. 1.

In an embodiment, request generator 210 generates one or more data transfer requests (e.g., data requests 122 of FIG. 1, discussed above) based on REST rules 242, URL mapping 244, and testing script 246. For example, REST rules 242, URL mapping 244, and testing script 246 may be stored as different digital files in memory 240 and accessible to request generator 210 and response manager 220. In an embodiment, the data transfer request generated by request generator 210 is an HTTP request or request message, as described above. It would be apparent to a person skilled in the relevant art given this description that embodiments are not intended to be limited to HTTP requests and that other types of data transfer requests may also be generated by request generator 210.

In an embodiment, REST rules 242 are standard REST rules that define a mapping between HTTP methods (e.g., GET, POST, PUT, DELETE) and REST operations (e.g., list, insert, delete). In an embodiment, URL mapping 244 includes a mapping of one or more REST operations to uniform resource locator (URL) template(s). An example of such a mapping from REST operation to URL template is shown below:

"tags.list":"/series/{seriesId}/submissions/{submissionId}/tags",                 (1)

"tags.insert":"/series/{seriesId}/submissions/{submissionId}/tags",                 (2)

"tags. delete":"/series/{seriesId}/submissions/{submissionId}/tags/{tagId}"                 (3)

A person skilled in the relevant art given this description would appreciate that the above mapping shown in lines (1), (2), and (3) is shown herein for illustrative purposes only and that embodiments are not limited thereto. In the example mapping shown above, the text in curly braces (e.g., "{seriesId}" and "{submissionId}") represents variables of the URL template that will be automatically substituted by request generator 210 based on the context of the data transfer request to be generated. Further, these variables are available to other types of requests for use in URL template patterns, request payloads, and/or various commands associated with each request payload, as will be described in further detail below.

In an example, URL mapping 244 may be defined by a user such as a QA test engineer involved in the development and testing of the REST API. As noted above, URL mapping 244 may be stored as a digital file in memory 240. In a different embodiment, the content of URL mapping 244 (e.g., REST operation to URL mapping as shown in lines (1)-(3) above) may be defined in testing script 246. For example, testing script 246 may include content generated by the user, and may be stored as a digital file in memory 240.

In an embodiment, testing script 246 includes a set of statements or commands written in a domain specific language. In an embodiment, the data transfer request generated by request generator 210 includes a request payload associated with the set of commands in testing script 246. In accordance with such an embodiment, the domain specific language enables the REST operations to be expressed using these commands independently of the request payload's syntax or character escaping issues. It would be apparent to a person skilled in the relevant art given this description that such considerations are commonly taken into account for HTTP request messages to be transmitted over a network as described above. Accordingly, one advantage of such a domain specific language is that it allows the user to express REST operations concisely and without consideration of the payload syntax or the escaping issues.

In an example, testing script 246 may be one of multiple testing scripts stored in memory 240, and the user may specify testing script 246 in particular by using user interface 230. User interface 230 may be a command-line user interface and/or graphical user interface communicatively coupled to language interpreter 115. In operation, user interface 230 may present information on a display to the user. The user may then specify the testing script to language interpreter 115 via user interface 230 using a user input device (e.g., mouse, keyboard, and/or touchscreen display) as described above. In this way, the user can invoke language interpreter 115 to generate data transfer requests and to automatically test the corresponding responses (e.g., responses 124 of FIG. 1, discussed above) received from an API service (e.g., API service 135 of FIG. 1) that implements the REST API to be tested.

In an embodiment, request generator 210 submits the generated data transfer request to an API service (e.g., API service 135 of FIG. 1, as described above) that implements the REST API that is to be tested. For example, the API service may be implemented on one or more servers (e.g., server(s) 130 of FIG. 1), and the data transfer request may be transmitted by request generator 210 to the server(s) over a network (e.g., from client 110 to server(s) 130 over network 120 of FIG. 1). The API service processes the data transfer request from request generator 210, and transmits an appropriate response or response payload over the network. An example request and response between a client implementing, for example, language interpreter 115 and a server implementing an API service for a REST API (e.g., API service 135 of FIG. 1) will be described in further detail below with respect to FIG. 3.

In an embodiment, response manager 220 is configured to receive responses from the API service (e.g., API service 135). For example, response manager 220 may utilize network interface 250 to receive one or more responses transmitted from the API service corresponding to the respective data transfer requests. In an embodiment, response manager 220 parses each response and automatically executes the commands defined in testing script 246. By executing the commands in testing script 246, response manager 220 automatically tests the received response to verify that the response satisfies one or more invariants of the REST API.

Example Commands for Domain Specific Language

Examples of various commands associated with the domain specific language will now be described. For example, one or more of these commands may be eluded in testing script 246 and interpreted by language interpreter 115 for generating data transfer requests to be processed by an API service (e.g., API service 135 of FIG. 1) and testing the corresponding responses from the API service, as described above. Further, each command may be defined as a command template with one or more variables that are used as parameters in the template expression, as will be shown in the descriptions of the exemplary commands below.

In an embodiment, language interpreter 115 may build and maintain one or more dictionaries that define names of variables that are used as the parameters for the various commands. It would be apparent to a person skilled in the relevant art given this description that the following list of example commands is provided for explanatory purposes, the list is not intended to be exhaustive, and that embodiments are not intended to be limited to just these commands. Also, it would be apparent to a person skilled in the relevant art given this description that any expression(s) that appear in the commands as described below may be written using any one of various well known high-level programming languages and notation formats as necessary.

Operation Command

In an embodiment, the domain specific language includes an operation command for specifying a type of the first representational state transfer operation. For example, such a command may be included in testing script 246 and interpreted by language interpreter 115, as described above. An exemplary syntax for such an operation command is shown in the expression below (where the '!' character denotes the start of each new command):

! OPERATION operation_name FIELDS FROM variable_name    (4)

In the example command provided in line (4) above, the "operation_name" parameter may correspond to one or more keywords in a Uniform Resource Identifier (URI) mapping. Further, "variable_name" may correspond to the source of the URI mapping information.

In an embodiment, such a URI mapping of representational state transfer operation and type can be used by language interpreter 115 and its components (request generator 210 and response manager 220) to generate data transfer requests and test the corresponding responses, as shown in FIGS. 1 and 2 and described above. For example, the source of the mapping may be a dictionary corresponding to a particular collection of resources. As noted above, such a dictionary or resource collection may comprise names of variables defined by the domain specific language. Further, such a dictionary may be maintained by language interpreter 115 and implemented using, for example, client 110, as shown in FIG. 1 and described above.

Authentication Command

In an embodiment, the domain specific language includes an authentication command for specifying authentication information. For example, such an authentication command may be included in testing script 246 and interpreted by language interpreter 115, as described above. An exemplary syntax for such an operation command is shown below:

! AUTH AS filename    (5)

In the example shown above in line (5), the "AUTH AS" command may be used to specify the filename (as indicated by "filename") from which client login information (e.g., in the form of a client login token) may be read.

Verification Command

In an embodiment, the commands defined in the domain specific language and interpreted by language interpreter 115 include a verification command for verifying the first response matches a predetermined template response, as shown by the following exemplary syntax below:

! RETURN expression AS variable_name    (6)

Using the example above, values from response bodies can be extracted and stored as a global variable. These vales can then be used later in substitutions. In the example shown in line (6) above, "expression" may comprise an expression written using any one of various well known high-level programming languages and notation formats. For example, such an expression may include any arbitrary Python expression, and the format may include dot notation (e.g., "data.id" may be an acceptable format, but not: "data.items[3]"). However, a person skilled in the relevant art given this description would appreciate that any supported language and notation format may be used as necessary, and that embodiments are not limited to Python or dot notation format.

Merge Command

In an embodiment, the commands defined in the domain specific language and interpreted by language interpreter 115 include a merge command for building a dictionary using different variables in the response from the server implementing the API service being tested. An exemplary syntax for such a command is shown below: ! RETURN expression MERGE variable name (7)

Using the "MERGE" command, as shows in the example in line (7) above, any variable in a dictionary referred to by the "expression" parameter will be updated in the dictionary corresponding to by "variable_name."

Replace Command

In an embodiment, the commands defined in the domain specific language and interpreted by language interpreter 115 include commands for variable replacement or substitution. An exemplary syntax for such an operation command is shown below:

! REPLACE some_variable WITH source_variable    (8)

! URLPARAM q some_search_query author:@some_variable@    (9)

In the example expression shown in line (8) above, the "REPLACE" command is being used to declare that the variable specified by "some_variable" is to be substituted with the variable specified by "source_variable." In the example expression shown in line (9), the "URLPARAM" command may be used to automatically execute a search query based on the response received from the server (or API service). In addition, the 'q' following the URLPARAM command may be used to denote that the search query as specified by the "some_search_query" variable should be executed using the same URL that was used to send the data transfer request.

In an embodiment, the REPLACE command may also be used to substitute values with output from user commands directly from a command shell interface, as shown by the exemplary syntax in the following expressions:

! REPLACE token WITH $(some shell command)    (10)

! REPLACE token WITH variable_name    (11)

Verify Response Command

In an embodiment, the commands defined in the domain specific language and interpreted by language interpreter 115 include a command to verify the content of information received from the server implementing the API service in response to a particular data transfer request. The verify response command can be used to verify the response from the server and is equivalent to a predetermined template response. Command templates thus may be used in reverse order. For example, rather than specifying a request payload (e.g., within testing script 246 of FIG. 2, described above), the user may define an expected or template response body. In an embodiment, language interpreter 115 may be configured to display an error message if the response to the operation is not equal to a provided template response.

Assert Command

In an embodiment, the commands defined in the domain specific language and interpreted by language interpreter 115 include an assert command, in which various expressions can be specified to assert desired behavior. As in the verification command described above, such expressions may be written in any one of various well known high-level programming languages including, but not limited to, Python. For example, such an assert command may function similarly to assert routines in conventional programming languages, as would be apparent to a person skilled in the relevant art given this description. Thus, for example, if the expression returns false, the testing script may display an error message, debugging information, and then may discontinue the testing process or routine as specified by the commands in, for example, testing script 246 of FIG. 2, described above.

Further, the expressions may be evaluated in a context associated with a few variables that facilitate the testing process. For example, such variables may include, but are not limited to, a "response" variable representing a deserialized response body, a "request" variable representing the deserialized data transfer request body, and any additional template variables as represented by a "vars" parameter. As noted above, the response body and data transfer request body may be represented in any well-known format used for data exchange or interchange including, but not limited to, JSON. Lines (12)-(14) below show exemplary expression syntax using these variables.

! ASSERT "items" not in response["data"] (12)

! ASSERT len(response["data"]["items"])==2 (13)

! ASSERT response["data"]["items"][1]["name"]==
    vars["vars_name"] (14)

For example, the expression as shown in line (12) above may be used to test that the "data" portion of a response payload (e.g., see response payload 320 of FIG. 3, as will be described below) does not include an "items" field. The example expression in line (13) above tests that the length of the "data" and "items" portions of the response payload is equivalent to a value of '2.' The example expression in line (14) tests whether the "data" and any "items" portions of the response payload include the variable specified by "vars_name." It would be apparent to a person skilled in the relevant art given this description that the above syntax and expressions in lines (12), (13), and (14) are provided for illustrative purposes and that embodiments are not limited thereto.

Example Test Case: Verifying Inserts

Figure 3:
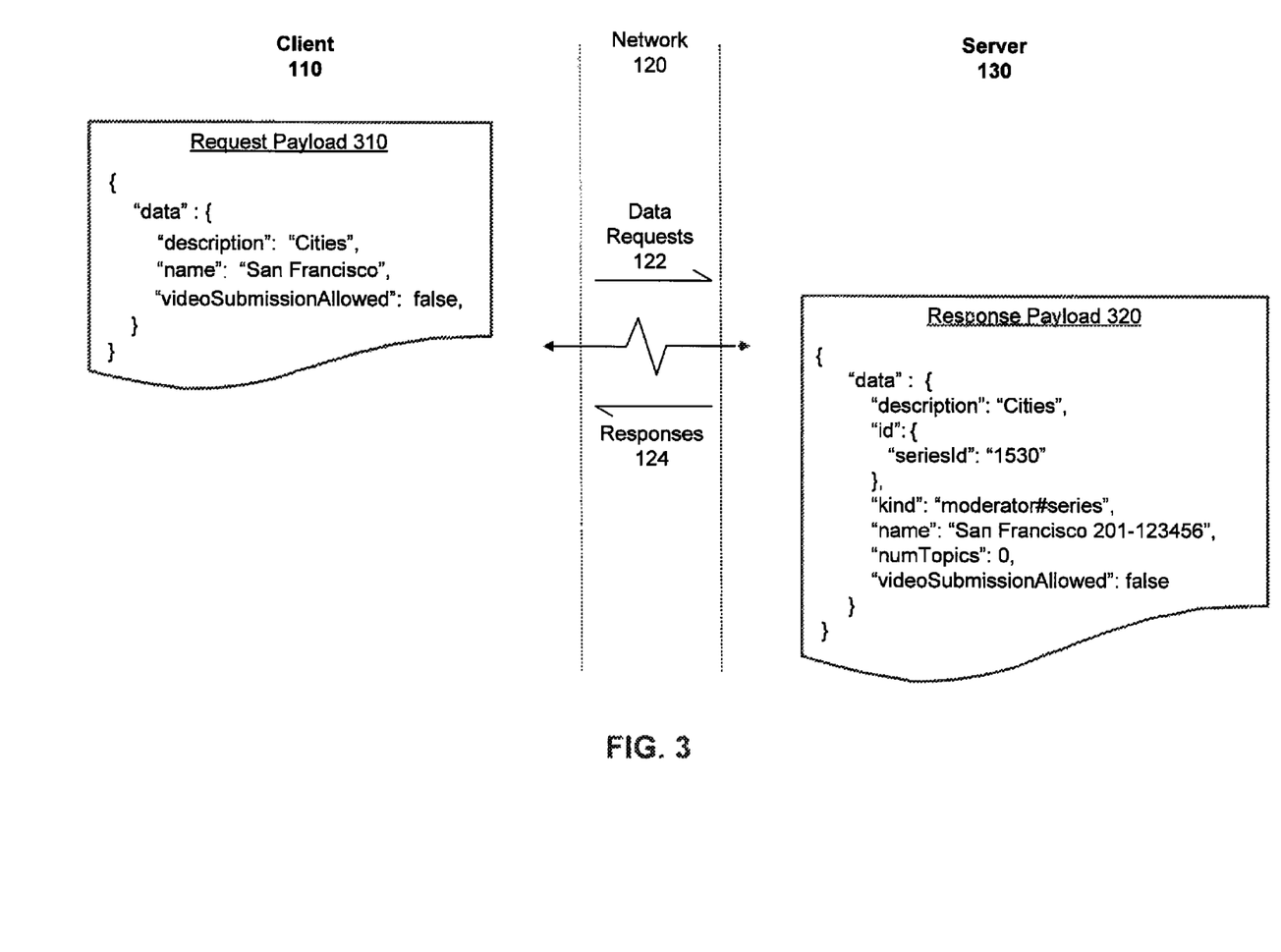
FIG. 3 illustrates example request and response payloads transferred between a client and server, according to an embodiment.

FIG. 3 illustrates example request and response payloads transferred between a client and a server, according to an embodiment. For ease of explanation, the example illustrated in FIG. 3 will be discussed in the context of systems 100 and 200 of FIGS. 1 and 2, respectively, as described above. However, embodiments are not intended to be limited thereto.

In the example shown in FIG. 3, data transfer requests may support any number of different REST operations or methods, including, but not limited to, ".list," ".get," ".update," and ".insert" methods. As will be shown in this example, expectations for one API method may be inferred based on the test results for another API method during verification testing of the RESTful API. For example, calling a ".insert" method for inserting an item 'X' into a collection 'C' implies that calling a ".get(X)" method for the same collection will produce a corresponding result or response including the same item that was inserted. Additionally, calling a ".list(C)" will reference or include the item X in the response. As would be apparent to a person skilled in the relevant art given this description, such expectations may be assumed to hold true even without requiring explicit ASSERT statements due to the constraints implied by the RESTful nature of the API being tested.

Therefore, it is assumed for this example that when a non-destructive mutation method is invoked (e.g., an insert or an update), the equivalent .get and .list methods may be automatically derived, and the response from the server can be tested to ensure that certain invariants are satisfied. As such, it is further assumed for this example that a REST API is being tested in which the following constraints, invariants, or predicate conditions should always hold true (and are therefore verifiable):

An identification field ("id") is always at a known location based on the type of data transfer request:
  For requests including ".get," ".update," or ".insert" methods (or simply "get, update, or insert requests), the "id" field is always located at "data.id."
  For requests including ".list" methods (i.e., "list requests"), the "id" field should be present in at least one of elements of the response.
The "id" of any entity or resource is always unique.
Fields specified in insert or update requests are guaranteed to be present in the entity response.
For lists requests, ".list" methods support ordering by descending creation time.

The above-listed invariants are provided for ease of explanation and illustrative purposes only, and embodiments are not intended to be limited thereto. A person skilled in the relevant art given this description would appreciate that this is just one example set of rules that can be inferred based on the expectations of the particular RESTful implementation used in this example. A person skilled in the relevant art given this description would also appreciate how such invariants may be identified and defined as necessary for different RESTful implementations.

As shown in the example of FIG. 3, request payload 310 represents a payload body of an exemplary insert request (e.g., sent as part of data requests 122) from client 110 to server 130 over network 120. Similarly, response payload 320 represents the payload body of an exemplary response (e.g., sent as part of responses 124) from server 130 to client 110 over network 120. For example, response payload 320 may be sent from server 130 (or from the API service implemented using server 130) once the data transfer request from client 110 has been processed, as previously described. In this example, the insert request corresponding to request payload 310 should cause the API being tested to insert the data specified by the data structure labeled "data," as shown in request payload 310. It is noted that the results sent by server 130 in response to a data transfer request from client 110 may be tested because any non-identification field present in an insert or update should be reflected in the returned body of the response. However, it may be difficult to automatically verify that derived or otherwise non-mutable non-identification fields (e.g., counters) or fields with default values in the response body are correct.

Based on the data transfer request corresponding to request payload 310, various tests can be generated and applied to the response corresponding to response payload 320. Examples of such tests may include, but are not limited to: testing to verify that the "data" sent as part of the insert request is included in the response; testing to verify that "data.id" exists in the response; testing to verify that "data.id" represents a valid dictionary, as described above; and testing to verify that "data.id" has at least one data entry. Similarly, additional tests may be performed to verify that that various data fields are present in the response payload. According to an embodiment, the API testing system is type-aware and thus, can be used to verify that the data type of a particular data field in the response payload matches the data type of the same or corresponding field in the request payload. In an example, an anomaly in the API is detected when a data field is defined as an integer (e.g., 0) in a first request and the same data field is returned as a string (e.g., "0") in response to a subsequent request.

As noted above, response payload 320 is sent from server 130 based on the insert request and request payload 310 from client 110. Thus, the following verification tests may be performed for the fields in response payload 320: verify presence "kind" field representing the kind of data; verify presence of "description" field; verify presence of "name" field; verify presence of "videoSubmissionsAllowed" field; verify that the "description" data field of response payload 320 matches the corresponding field of request payload 310 (e.g., "response.data.description==insertrequest.data.description").

Once these initial tests pass, additional tests may be performed by transmitting new data transfer requests. For example, the first ".insert" request may be followed with a ".get" request, which should return a response that includes the data inserted (e.g., a similar response with a payload as shown in response payload 320). As such, the subsequent ".get" request can be used to verify the insert request was successful. Data fields included in a response payload to the subsequent ".get" request should match the data fields that are inserted using the ".insert" request. Using the example described above, an item of data in the insert request may be defined according to a specific type. Consequently, the get request for this data should match the data type of the inserted data item. An anomaly in the API may be detected if, for example, the inserted data is defined as an integer and the data that is returned in response to the subsequent get request is a string. In this way, aberrational properties of a response to a data transfer request can be detected based on inferences from previous requests or responses.

Further, the predefined constraints of the REST API being tested allow additional verification tests to be performed by automatically generating subsequent requests based on inferences drawn from previous requests and responses. Accordingly, such additional verification tests may be performed as necessary, for example, by sending additional insert, get, update, or list requests from client 110 to server 130, and then testing the responses from server 130 in response to such requests. Examples of such additional tests include, but are not limited to, cross-collection tests and other tests to detect various anomalies in the implementation of the REST API.

Cross-Collection Tests

For example, such tests may be used to exercise a variety of resource collections in order to check potential issues across different collections. Specific tests that fall into this category of tests may include, but are not limited to, testing the correctness of the "kind" of data associated with an entity in the API system. The following list includes examples of invariants of the REST API being tested in this example with respect to different REST operations:

".list" methods should have a "kind" suffixed with the particular "List" associated with a resource collection other methods that are not ".list" methods (e.g., .get, .insert, and .update methods) should not have a "list" suffix .get, .insert, and .update responses should all have the same "kind"

.get, .insert, and .update responses should not have a "kind" in common with other collections (i.e., each "kind" should be specific to a particular collection).

The example invariants listed above are provided for illustrative purposes only, and embodiments are not intended to be limited thereto. A person skilled in the relevant art given this description would appreciate that the tests and invariants being tested may be adapted to the particular API/API service being tested.

Detecting Anomalies

There are some characteristics of fields in a REST API which can be detected by passively observing a series of REST transactions. For example, some fields in the API may be mutable, while others may not. Also, some fields may be derived from backend algorithms or processes (e.g., at server 130), and some fields may be provided entirely by the client 110.

In an embodiment, language interpreter 115 adaptively predicts the behavior of various data fields that are returned in the response payloads. For example, language interpreter 115 can be configured to exercise or test an API by executing a series of commands (expressed in the domain specific language) as these commands are defined in a testing script (e.g., testing script 246 of FIG. 2), as described above. Accordingly, language interpreter 115 can learn the behavior of various fields so as to identify inconsistencies. Such inconsistencies may then be displayed by language interpreter 115 as notifications to the user (e.g., the API developer or test engineer).

In an example, the API being tested may allow an empty string (e.g., " ") to be inserted as a value of a particular field (e.g., via an insert data transfer request). This field may be associated with, for example, a persistent entity or object accessible to the API. If for some reason, the API were to treat such an empty string as a "clear field" that does not have a value, it may choose not to return the particular field in responses to subsequent requests. However, if the same API being tested allows a similar type of empty string to persist for a different data field (e.g., associated with the same or a different entity of the API) across the responses to a series of requests, such an inconsistency may be identified or flagged by language interpreter 115 as a potential bug in the API.

Method

Figure 4:
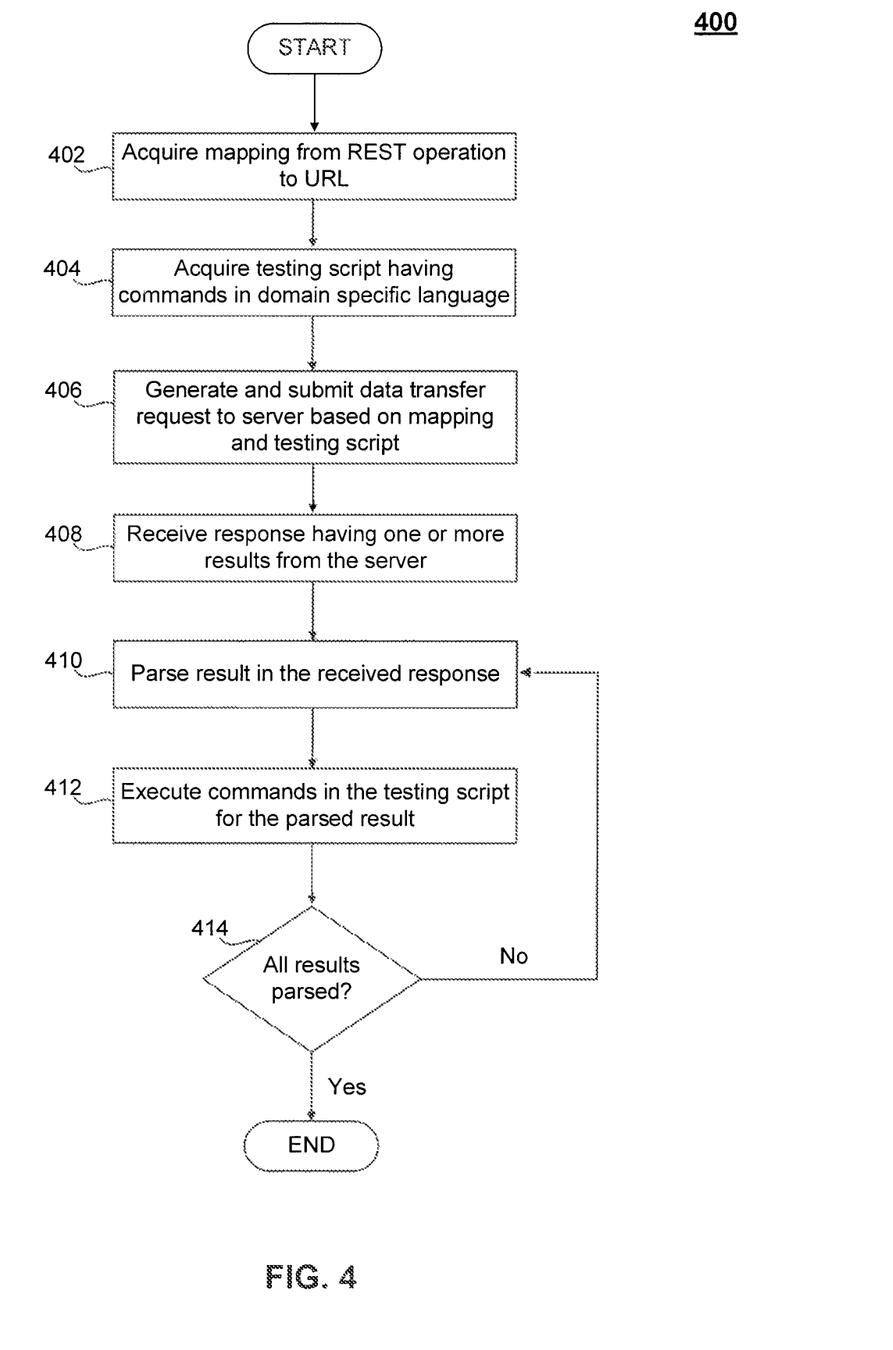
FIG. 4 is a process flowchart of an exemplary method for automatically detecting an anomaly in an API having a plurality of invariants, according to an embodiment.

FIG. 4 is a process flowchart of an exemplary method 400 for automatically detecting an anomaly in an API having a plurality of invariants, according to an embodiment. For ease of explanation, method 400 will be described with respect to system 100 of FIG. 1 and system 200 of FIG. 2, as described above. However, method 400 is not intended to be limited thereto.

Method 400 begins in step 402, which includes acquiring a mapping from Representational State Transfer (REST) operation to Uniform Resource Locator (URL). For example, such a mapping may include one or more REST operations to URL templates or template patterns, as described above. An example of such a mapping is shown above in lines (1), (2), and (3).

As shown in FIG. 4, method 400 then proceeds to step 404 in which a testing script (e.g., testing script 246 of FIG. 2, described above) is acquired. The testing script includes one or more commands written in a domain specific language, as described above. Further, the REST operation to URL mapping acquired in step 402 may be defined, for example, within the testing script 246. As such, steps 402 and 404 of method 400 may be combined into a single step.

Once the REST operation to URL mapping and the commands written in the domain specific language have been acquired, method 400 proceeds to step 406. Step 406 includes generating and submitting a data transfer request to a server implementing the REST API being tested (e.g., server 130 of FIG. 1, as described above). The data transfer request is generated based on the acquired mapping and the commands as specified in the testing script (i.e., steps 402 and 404). The generated data transfer request may include a payload body (or simply "payload") corresponding to each REST operation in the REST operation to URL mapping acquired in step 402. For example, the generated and submitted data transfer request may be in the form of an HTTP request, as described previously.

In an embodiment, the domain specific language enables the REST operations to be expressed via the one or more commands, independently of the syntax or the request payload. Additionally, the domain specific language allows the data transfer request to be generated without having to account for character-escaping issues. A person skilled in the relevant art given this description would appreciate that such character-escaping issues (or simply "escape issues") are prevalent in such data transfer requests, and particularly in HTTP requests. Steps 402, 404, and 406 of method 400 may be performed by, for example, request generator 210 of FIG. 2, as described above.

In step 408, a response is received from the server based on the data transfer request that was sent in step 406. Like the data transfer request, the response from the server may also be in the form of a HTTP request. For example, the response from the server may include one or more results in a response payload based on the processing of the data transfer request by the server (or by the API service implemented at the server). It would be apparent to a person skilled in the relevant art that an API service for the REST API being tested may be implemented at a single server or across multiple servers communicatively coupled over a network (e.g., network 120 of FIG. 1, as described above). Any reference to a single server with respect to embodiments as described herein and as shown in the example flowchart of FIG. 4 is therefore used for ease of explanation, and is not intended to limit embodiments thereto.

Method 400 proceeds to step 410 in which the result(s) in the response received from the server are parsed. In step 412, the commands specified in the testing script are executed for the parsed results in order to verify the results satisfy the invariant/predicate conditions of the REST API being tested. Method 400 then proceeds to step 414 in which it is determined whether all results in the response from the server have been processed (i.e., parsed and tested). If it is determined in step 414 that all the results have not been processed, steps 410 and 412 are repeated until each result in the response from the server has been processed based on the commands specified in the testing script. Steps 408, 410, 412, and 414 of method 400 may be performed by, for example, response manager 220 of FIG. 2, as described above.

Figure 5:
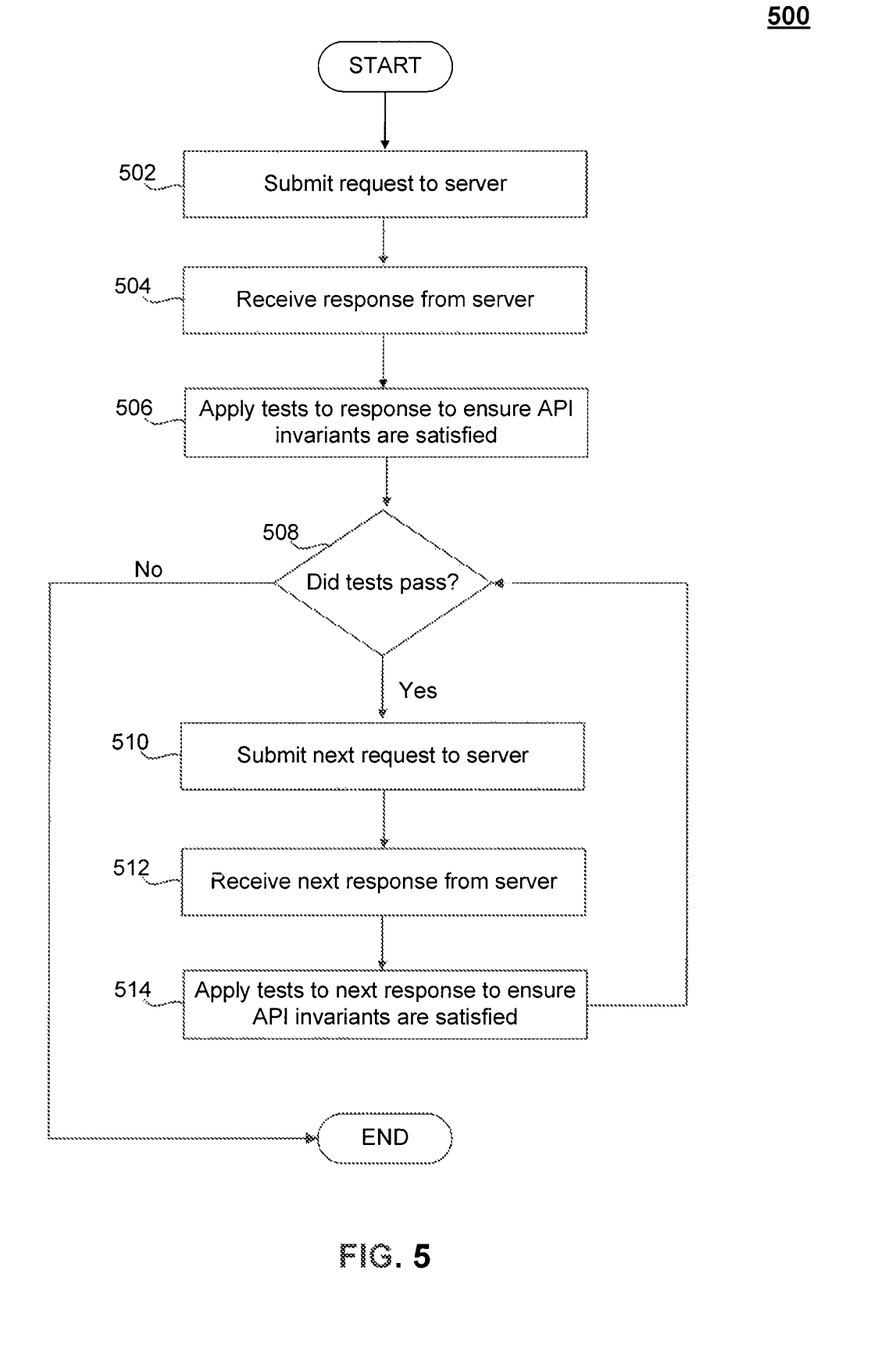
FIG. 5 is a process flowchart of another exemplary method for automatically detecting an anomaly in an API having a plurality of invariants, according to an embodiment.

FIG. 5 is a process flowchart of another exemplary method for automatically detecting anomalies in an API having a plurality of invariants, according to an embodiment. For ease of explanation, method 500 will be described with respect to system 100 of FIG. 1 and system 200 of FIG. 2, as described above. However, method 500 is not intended to be limited thereto.

Like method 400 of FIG. 4, described above, method 500 enables a user to test a set of results sent from a server (or API service) implementing the API being tested in response to a data transfer request (e.g., steps 408, 410, 412, and 414 of method 400). Also like method 400, method 500 performs each test based on one or more commands specified, for example, in a testing script (e.g., testing script 246 of FIG. 2, described above) after parsing the results from the server.

However, method 500 expands the scope of method 400 by further enabling such a user to submit additional data transfer requests to the same server (or API service) once it is determined that the initial set of results have passed the tests, as specified, for example, in a testing script. It would be apparent to a person skilled in the relevant art given this description that any number of testing scripts may be used as necessary. Further, a particular testing script may include a reference to another testing script including additional commands defined by the user. For example, the additional commands may also be written in the domain specific language. Accordingly, the user is enabled to express additional representational state transfer (REST) operations via these additional commands without having to be preoccupied by syntax or escape character issues that may be associated with conventional data requests for REST operations.

Method 500 begins in step 502, in which a data transfer request is submitted to a server implementing the API being tested. In an embodiment, the API being tested is a REST API having a plurality of invariants that are assumed to always hold true. Step 502 may be performed by, for example, request generator 210 of FIG. 2, as described above. A response from the server corresponding to the submitted request may be received in step 504. As described above, the request and response may be, for example, HTTP requests. Further, the response may include one or more results based on the data transfer request that is processed by the server.

In step 506, one or more tests are applied to each result in the response so as to ensure any invariants of the API are satisfied. As described above, the tests that are applied are based on the commands written in the domain specific language, which may be specified in, for example, a testing script generated by the user. In step 508, method 500 determines whether the applied tests based on the commands in the testing script have passed. If not, method 500 proceeds to end after step 508.

However, if all tests have passed, and thus, all invariants of the API have been found to be satisfied by the results included in the initial response from the server, method 500 proceeds to steps 510, 512, and 514. In step 510, a new data transfer request is generated and submitted to the server. In step 512, the next response from the server corresponding to the newly submitted request is received. In step 514, additional tests are applied to the results in the next response by executing one or more additional commands that are specified in the same or different testing script, as noted above.

As illustrated in FIG. 5, steps 508, 510, 512, and 514 of method 500 are repeated using new data transfer requests that are generated once it is determined that all tests have passed (in step 508) for each set of results, which are sent by the server in response to the data transfer request submitted previously (in step 510). As noted above, method 500 may end if it is determined during the testing process that a particular result from the server failed to pass and an invariant condition of the API was therefore determined to be violated. Method 500 may also end once all tests that are based on the commands specified in, for example, one or more testing scripts have been performed.

Although not shown in FIG. 5, the user may also be allowed to manually stop testing of the API via a user interface, or to specify a timeout option limiting the duration in which the tests should be executed. For example, such a timeout option or duration may be specified using a command or option that is expressed in the domain specific language within a testing script. Steps 504, 506, 508, 510, 512, and 514 may be performed by, for example, response manager 220 of FIG. 2, as described above.

Example Computer System Implementation

Embodiments shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
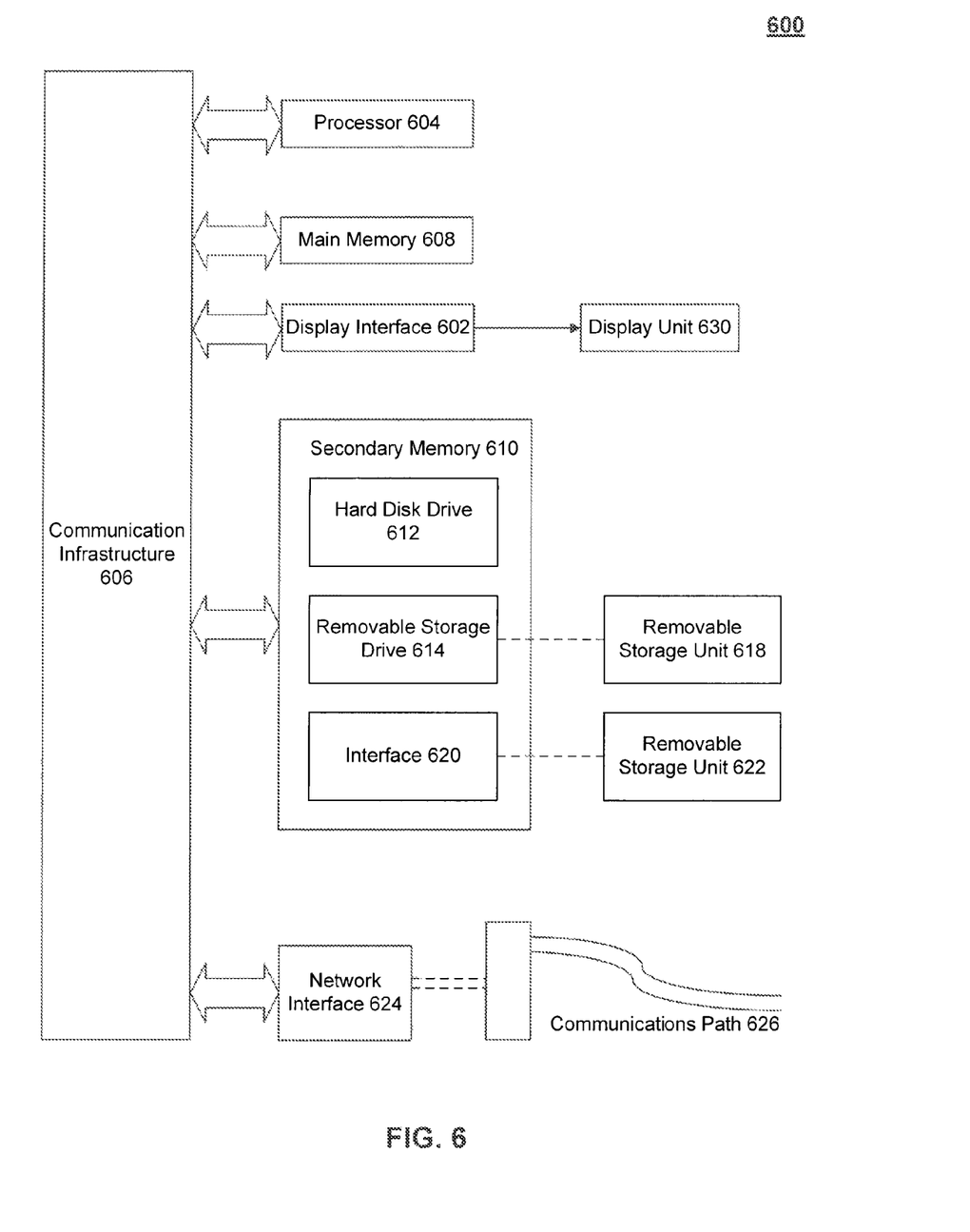
FIG. 6 is a diagram of an example computer system in which embodiments can be implemented.

FIG. 6 illustrates an example computer system 600 in which embodiments, or portions thereof, may be implemented as computer-readable code. For example, language interpreter 115, including its components, as shown in FIGS. 1 and 2 can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-2.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a network interface 624. Network interface 624 allows software and data to be transferred between computer system 600 and external devices. Network interface 624 may include a modem, a network interface (such as an Ethernet card), a communications port, a PCMCIA slot and card, or the like. Software and data transferred via network interface 624 may be in the form of signals, which may be electronic, electromagnetic, optical, or other signals capable of being received by network interface 624. These signals may be provided to network interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via network interface 624. Such computer programs, when executed, enable computer system 600 to implement embodiments as discussed herein. In particular, the computer programs, when executed, enable processor device 604 to implement the processes of embodiments of the present invention, such as the stages in the methods illustrated by flowcharts 300 and 400 of FIGS. 3 and 4, respectively, discussed above. Accordingly, such computer programs represent controllers of the computer system 600. Where embodiments are implemented using software, the software may be stored in a computer program product and loaded into computer system 600 using removable storage drive 614, interface 620, and hard disk drive 612, or network interface 624.

Embodiments of the invention also may be directed to computer program products comprising software stored on any computer useable medium. Such software, when executed in one or more data processing device(s), causes a data processing device(s) to operate as described herein.

Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

Variations

As would be understood by a person skilled in the art based on the teachings herein, several variations of the above described features of automatic anomaly detection in an API having a plurality of invariants. These variations are within the scope of embodiments of the present invention. For the purpose of illustration only and not limitation, a few variations are provided herein.

In an example, one skilled in the art can envision several variations to the scripting syntax, as described above. In an embodiment, a different scripting syntax may be used in place of the purpose-specific domain specific language described above. For example, any well-known scripting language generally used by those skilled in the relevant art for writing testing scripts may also be used to evaluate results sent from a server in response to one or more data transfer requests using REST operations. An example of such a scripting language includes JavaScript.

In another example of a variation, embodiments of the language interpreter (e.g., language interpreter 115 of FIGS. 1 and 2), as described herein may be further configured to determine that certain tests based on commands specified in a script are independent, and consequently could be run in parallel. Such parallel execution of these tests would greatly increase the efficiency and speed of verification testing.

Additional variations that may be incorporated into embodiments as described herein may include, but are not limited to: support for testing scripts written in an extensible markup language (XML) or other representation-neutral format; automatic transformation of JSON response bodies to XML bodies based on templates; support for automatic fuzz testing; features to track API changes over time; and deriving static analysis rules to apply against API client implementations using test data collected based on commands specified in a testing script(s).

CONCLUSION

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for automatically detecting an anomaly in an application programming interface having a plurality of invariants, the method comprising:

generating a first data transfer request based on a first mapping of a first representational state transfer operation to a first uniform resource locator template and a request payload, the request payload associated with one or more first commands written in a domain specific language that enables the first representational state transfer operation to be expressed using the one or more first commands independently of the request payload's syntax or escape characters;

submitting the generated first data transfer request to a server that implements the application programming interface for processing;

receiving a first response from the server based on the submitted first data transfer request; and automatically testing the received first response based on the one or more first commands in order to verify that the first response satisfies a first invariant in the plurality of invariants of the application programming interface, wherein the generating, the submitting, the receiving, and the testing are performed by one or more computing devices; and wherein at least one command in the one or more first commands includes one or more variables, the one or more first commands written in the domain specific language include a return command for extracting a value from the first response and storing the value as a global variable, and the global variable may be substituted for the one or more variables in the one or more first commands.

2. The method of claim 1, further comprising:

generating a second data transfer request based on a second mapping of a second representational state transfer operation to a second uniform resource locator template and one or more second commands expressed in the domain specific language;

submitting the generated second data transfer request to the server for processing;

receiving a second response from the server based on the submitted second data transfer request; and automatically testing the received second response based on the one or more second commands in order to verify that it satisfies a second invariant in the plurality of invariants of the application programming interface.

3. The method of claim 1, wherein the first response from the server includes one or more results, and wherein the automatically testing comprises:

parsing each of the one or more results in the first response; and automatically testing each of the parsed results based on the one or more first commands in order to verify that it satisfies the first invariant of the application programming interface.

4. The method of claim 1, wherein the first data transfer request is a Hypertext Transfer Protocol request.

5. The method of claim 1, wherein the one or more first commands written in the domain specific language include an operation command for specifying a type of the first representational state transfer operation.

6. The method of claim 1, wherein the one or more first commands written in the domain specific language include an authentication command for specifying authentication information.

7. The method of claim 1, wherein the one or more first commands written in the domain specific language include a verification command for verifying the first response matches a predetermined template response.

8. The method of claim 1, further comprising:
identifying request constraints associated with the first data transfer request;
generating a second data transfer request in accordance with the identified request constraints; and
submitting the generated second data transfer request to the server that implements the application programming interface for processing.

9. The method of claim 8, further comprising:
identifying new request constraints based on the first and second data transfer requests; and
generating a third data transfer request in accordance with the identified new request constraints.

10. The method of claim 8, wherein the identifying comprises:
identifying the request constraints based on the one or more first commands associated with the first data transfer request, the request constraints specified in a user test script that includes the one or more first commands and the request payload.

11. The method of claim 8, further comprising:
receiving a second response from the server based on the submitted second data transfer request; and
automatically testing the received second response based on the first data transfer request in order to verify that the second response satisfies the identified request constraints associated with the first data transfer request.

12. A computer-implemented method for automatically detecting an anomaly in an application programming interface having a plurality of invariants, the method comprising:
generating a first data transfer request based on a first mapping of a first representational state transfer operation to a first uniform resource locator template and a request payload, the first uniform resource locator template comprising one or more variable parameters, the request payload associated with one or more first commands written in a domain specific language that enables the first representational state transfer operation to be expressed using the one or more first commands independently of the request payload's syntax or escape characters;
submitting the generated first data transfer request to a server that implements the application programming interface for processing;
receiving a first response from the server based on the submitted first data transfer request; and
automatically testing the received first response based on the one or more first commands in order to verify that the first response satisfies a first invariant in the plurality of invariants of the application programming interface;
wherein the generating, the submitting, the receiving, and the testing are performed by one or more computing devices; and
wherein the generating further comprises:
generating the first data transfer request based on a second mapping between a data transfer method and the first representational state transfer operation;
substituting the first representational state transfer operation with the data transfer method based on the third mapping between the data transfer method and the first representational state transfer operation; and
substituting the one or more variable parameters of the first uniform resource locator template with one or more corresponding predetermined values based on the first mapping of the first representational state transfer operation to the first uniform resource locator template.

13. A computer-implemented method for automatically detecting an anomaly in an application programming interface having a plurality of invariants, the method comprising:
generating a first data transfer request based on a first mapping of a first representational state transfer operation to a first uniform resource locator template and a request payload, the request payload associated with one or more first commands written in a domain specific language that enables the first representational state transfer operation to be expressed using the one or more first commands independently of the request payload's syntax or escape characters;
submitting the generated first data transfer request to a server that implements the application programming interface for processing;
receiving a first response from the server based on the submitted first data transfer request; and
automatically testing the received first response based on the one or more first commands in order to verify that the first response satisfies a first invariant in the plurality of invariants of the application programming interface,
wherein the generating, the submitting, the receiving, and the testing are performed by one or more computing devices; and
wherein the plurality of invariants includes one or more of data-typing rules, nesting rules, formatting rules, default-value rules, and content-mismatch rules, wherein each of the data-typing rules, the nesting rules, the formatting rules, the default-value rules, and the content-mismatch rules may be based on variables associated with the first uniform resource locator template.

14. A computer-implemented method for automatically detecting an anomaly in an application programming interface having a plurality of invariants, the method comprising:
identifying request constraints associated with a first data transfer request, the identifying including recognizing data type and formatting patterns associated with the first data transfer request;
generating the first data transfer request based on a first mapping of a first representational state transfer operation to a first uniform resource locator template and a request payload, the request payload associated with one or more first commands written in a domain specific language that enables the first representational state transfer operation to be expressed using the one or more first commands independently of the request payload's syntax or escape characters;

submitting the generated first data transfer request to a server that implements the application programming interface for processing;
receiving a first response from the server based on the submitted first data transfer request;
automatically testing the received first response based on the one or more first commands in order to verify that the first response satisfies a first invariant in the plurality of invariants of the application programming interface;
generating a second data transfer request in accordance with the identified request constraints and based on the recognized data type and formatting patterns; and
submitting the generated second data transfer request to the server that implements the application programming interface for processing;
wherein the generating, the submitting, the receiving, and the testing are performed by one or more computing devices.

15. A system for automatically detecting an anomaly in an application programming interface having a plurality of invariants, the system comprising:
non-transitory memory storing instructions; and
a data processing device in communication with the non-transitory memory and executing the instructions to implement:
a request generator configured to generate a first data transfer request based on a first mapping of a first representational state transfer operation to a first uniform resource locator template and a request payload, the request payload associated with one or more first commands written in a domain specific language that enables the first representational state transfer operation to be expressed using the one or more first commands independently of the request payload's syntax or escape characters, and to submit the generated first data transfer request to a server that implements the application programming interface for processing; and
a response manager configured to receive a first response from the server based on the submitted first data transfer request, and to automatically test the received first response based on the one or more first commands in order to verify that the first response satisfies a first invariant in the plurality of invariants of the application programming interface;
wherein at least one command in the one or more first commands includes one or more variables, and wherein the one or more first commands written in the domain specific language include a return command for extracting a value from the first response and storing the value as a global variable, wherein the global variable may be substituted for the one or more variables in the one or more first commands.

16. The system of claim 15, wherein the request generator is further configured to generate a second data transfer request based on a second mapping of a second representational state transfer operation to a second uniform resource locator template and one or more second commands expressed in the domain specific language, and to submit the generated second data transfer request to the server for processing, and
wherein the response manager is further configured to receive a second response from the server based on the submitted second data transfer request, and to automatically test the received second response based on the one or more second commands in order to verify that it satisfies a second invariant in the plurality of invariants of the application programming interface.

17. The system of claim 15, wherein the first response from the server includes one or more results, and wherein the response manager is configured to parse each of the one or more results in the first response, and to automatically test each of the parsed results based on the one or more first commands in order to verify that it satisfies the first invariant of the application programming interface.

18. The system of claim 15, wherein the first data transfer request is a Hypertext Transfer Protocol request.

19. The system of claim 15, wherein the one or more first commands written in the domain specific language include an operation command for specifying a type of the first representational state transfer operation.

20. The system of claim 15, wherein the one or more first commands written in the domain specific language include an authentication command for specifying authentication information.

21. The system of claim 15, wherein the one or more first commands written in the domain specific language include a verification command for verifying the first response matches a predetermined template response.

22. The system of claim 15, wherein the request generator is further configured to identify request constraints associated with the first data transfer request, to generate a second data transfer request in accordance with the identified request constraints, and to submit the generated second data transfer request to the server that implements the application programming interface for processing.

23. The system of claim 22, wherein the request generator is further configured to identify new request constraints based on the first and second data transfer requests, and to generate a third data transfer request in accordance with the identified new request constraints.

24. The system of claim 22, wherein the request generator is configured to identify the request constraints based on the one or more first commands associated with the first data transfer request, and the request constraints are specified in a user test script that includes the one or more first commands and the request payload.

25. The system of claim 22, wherein the response manager is further configured to receive a second response from the server based on the submitted second data transfer request, and to automatically test the received second response based on the first data transfer request in order to verify that the second response satisfies the identified request constraints associated with the first data transfer request.

26. A system for automatically detecting an anomaly in an application programming interface having a plurality of invariants, the system comprising:
non-transitory memory storing instructions; and
a data processing device in communication with the non-transitory memory and executing the instructions to provide:
a request generator configured to generate a first data transfer request based on a first mapping of a first representational state transfer operation to a first uniform resource locator template and a request payload, the request payload associated with one or more first commands written in a domain specific language that enables the first representational state transfer operation to be expressed using the one or more first commands independently of the request payload's syntax or escape characters, and to submit the generated first data transfer request to a server that implements the application programming interface for processing; and a response manager configured to receive a first response from the server based on the submitted first data transfer request, and to automatically test the received first response based on the one or more first commands in order to verify that the first response satisfies a first invariant in the plurality of invariants of the application programming interface;

wherein the first uniform resource locator template includes one or more variable parameters, wherein the request generator is further configured to generate the first data transfer request based on a third mapping between a data transfer method and the first representational state transfer operation, to substitute the first representational state transfer operation with the data transfer method based on the third mapping between the data transfer method and the first representational state transfer operation, and to substitute the one or more variable parameters of the first uniform resource locator template with one or more corresponding predetermined values based on the first mapping of the first representational state transfer operation to the first uniform resource locator template.

27. A system for automatically detecting an anomaly in an application programming interface having a plurality of invariants, the system comprising:

non-transitory memory storing instructions; and a data processing device in communication with the non-transitory memory and executing the instructions to provide:

a request generator configured to generate a first data transfer request based on a first mapping of a first representational state transfer operation to a first uniform resource locator template and a request payload, the request payload associated with one or more first commands written in a domain specific language that enables the first representational state transfer operation to be expressed using the one or more first commands independently of the request payload's syntax or escape characters, and to submit the generated first data transfer request to a server that implements the application programming interface for processing; and a response manager configured to receive a first response from the server based on the submitted first data transfer request, and to automatically test the received first response based on the one or more first commands in order to verify that the first response satisfies a first invariant in the plurality of invariants of the application programming interface;

wherein the plurality of invariants includes one or more of data-typing rules, nesting rules, formatting rules, default-value rules, and content-mismatch rules, wherein each of the data-typing rules, the nesting rules, the formatting rules, the default value rules, and the content-mismatch rules may be based on variables associated with the first uniform resource locator template.

28. A system for automatically detecting an anomaly in an application programming interface having a plurality of invariants, the system comprising:

non-transitory memory storing instructions; and a data processing device in communication with the non-transitory memory and executing the instructions to provide:

a request generator configured to generate a first data transfer request based on a first mapping of a first representational state transfer operation to a first uniform resource locator template and a request payload, the request payload associated with one or more first commands written in a domain specific language that enables the first representational state transfer operation to be expressed using the one or more first commands independently of the request payload's syntax or escape characters, and to submit the generated first data transfer request to a server that implements the application programming interface for processing; and a response manager configured to receive a first response from the server based on the submitted first data transfer request, and to automatically test the received first response based on the one or more first commands in order to verify that the first response satisfies a first invariant in the plurality of invariants of the application programming interface;

wherein the request generator is further configured to identify request constraints associated with the first data transfer request, to generate a second data transfer request in accordance with the identified request constraints, and to submit the generated second data transfer request to the server that implements the application programming interface for processing; and wherein the request generator is configured to recognize data type and formatting patterns associated with the first data transfer request, and to generate the second data transfer request based on the recognized data type and formatting patterns.

* * * * *